Aug. 28, 1923.

E. PASCUCCI

REFLECTOR

Filed Nov. 29, 1920

E. Pascucci,
INVENTOR

Patented Aug. 28, 1923.

1,466,410

UNITED STATES PATENT OFFICE.

EMILIO PASCUCCI, OF CORNING, NEW YORK, ASSIGNOR TO CORNING GLASS WORKS, OF CORNING, NEW YORK, A CORPORATION OF NEW YORK.

REFLECTOR.

Application filed November 29, 1920. Serial No. 427,095.

*To all whom it may concern:*

Be it known that I, EMILIO PASCUCCI, a citizen of the United States of America, and a resident of the city of Corning, county of Steuben, State of New York, have invented certain new and useful Improvements in Reflectors, of which the following is a specification.

This invention has for its object to provide a reflector in which spherical aberration by reflection is reduced or entirely eliminated, and this without the difficulties which allowed the formation of parabolic surfaces. For this purpose there is combined, in a single structure, a concave reflecting surface having spherical aberration, and a refracting body overcoming such aberration. This is accomplished by the use of a concavo-convex transparent element, the faces of which are so shaped that light falling on the front concave face thereof and passing therethrough, after reflection from the convex rear face (which may be suitably coated) and after again issuing from the front face, will be directed, due to refraction, as though spherical aberration was not present. Such a structure is therefore a katadioptric element.

Referring to the accompanying drawings in which corresponding parts are designated by corresponding marks of reference,—

Figure 1:
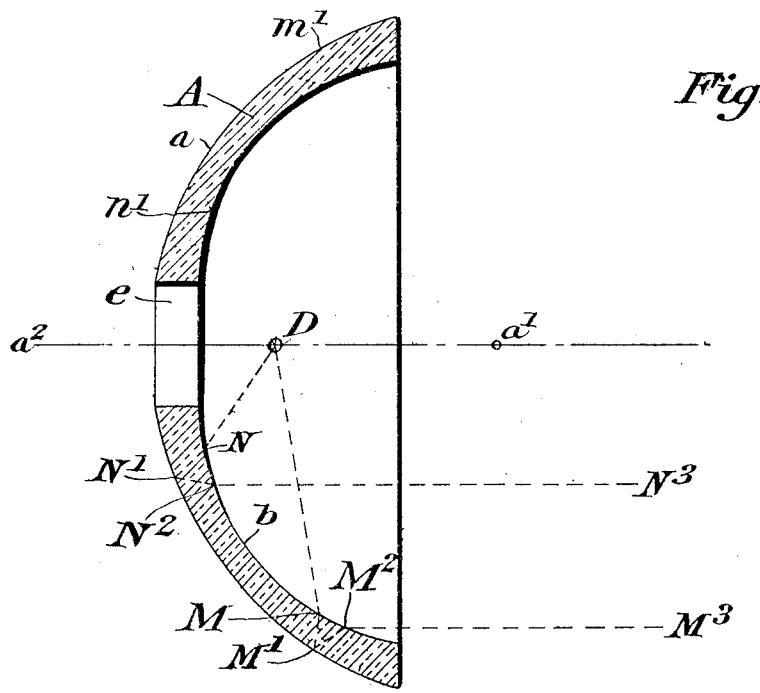
Figure 1, is a central longitudinal section through a reflector embodying this invention.

As is well known, only that part of a spherical mirror located within a few degrees about its peripheral axis is capable of reflecting in a parallel beam light emanating from the principal focal point of such portion, rays from such point falling on the mirror outside of such portion being convergently reflected. It is also known that rays from a light source located behind the principal focal point of a spherical mirror are in the absence of spherical aberration divergently reflected. In the present invention the divergence, due to a source located behind the principal focal point of the central portion of the mirror is utilized to correct, for a given and selected zone of the mirror intermediate of its center and its periphery, the convergence due to spherical aberration, so that while portions of the mirror inside of such zone tend to project a divergent beam, and portions outside of the zone a convergent beam, the reflection of the two last named portions are corrected by refraction, due to the radial cross section given to the mirror by the contour of its front and rear faces.

Referring to the embodiment shown in the drawings, the rear cover face $a$ of the light projecting element A (which may be of transparent glass) is spherical, being struck from the center $a^1$, while the front concave face $b$ is non-spherical, successive parts thereof on each side of the principal axis $a^1$—$a^2$, being struck from the points $b^1$, $b^2$, $b^3$, and $b^4$, which are so located that the light projecting element A gradually increases in thickness on a radial line from a circle concentric with the principal axis and intermediate of it and the peripheral front edge of the element, the element in effect being thus composed of inner and outer annular prismoids, whose bases are reversed in respect to each other, the rear face of each prismoid being spherical, and the forward face of which is non-spherical.

The rear face $a$ is given a reflecting coating in any proper and known manner, as by silvering.

The central portion of the front face may, if desired, and as shown, be formed flat inasmuch as in practice, the greater portion of this is cut away at $e$ to receive the socket of the lamp employed as the light source.

A suitable light source D is located behind the principal focal point of the non-central portion of the spherical mirror formed by the coated rear face. This location is such that were the front and rear faces of the element A parallel to each other, light falling on the element at a point near its periphery would, say at $m^1$, due to reflection and refraction, be projected convergently in respect to the principal axis, this being due to spherical aberration. Under the same supposition, a ray falling on the front face of the element A at a point nearer the principal axis, say at $n^1$, will be reflected and refracted divergently in respect to the principal axis. It will be noted that the spherical aberration of rays reflected from a spherical mirror at a point corresponding to $n^1$ is, due to the location of such point, much less than that of the rays reflected from a point such as $m^1$, so that as to the last named point the divergence, due to the location of the light source, overcomes the convergence due to spherical aberration. It will be further noted that under the supposition made, refraction is not effective in diverting the direction of the rays.

If, however, the light projecting element A has not parallel front and rear faces, but has at the point $m^1$ the cross section of a prismoid, with the base outward, and at $n^1$ that of a prismoid with the base inward, the path of the rays is modified. As shown by the dashed lines $M—M^1—M^2—M^3$ on the lower half of Figure 1, the refraction of the outer prism tends to draw the ray impinging on a part of the front face corresponding to the point $m$, before considered, into parallelism with the principal axis, while due to the action of the inner prism, the reverse is true of a ray falling on a point N corresponding to the point $n^1$, as is shown by the dashed line $D—N—N^1—N^2—N^3$.

Rays falling on the front face, immediately at the junction of the prisms, are refracted towards the axis on entering the light projecting element, and in the reverse direction on leaving the element. These refractions practically neutralize each other, so that the direction of the rays after leaving the element is determined solely by the reflecting face. The light source is thus located substantially at the principal focal point of that part of the reflecting face which is located behind the circle separating the outer and inner prismoids.

By selecting proper locations for the centers and proper lengths for the radii of curvature of the several faces and parts thereof, a mirror of short focal length and large area may be constructed which will project a substantially parallel beam, and this without the difficulties attending the use of parabolic surfaces which are difficult to obtain in a polished condition in glass.

The construction described has the advantage that the reflecting surface is a convex one and is spherical, and is hence easy to polish by machinery. On the other hand, slight irregularities on the concave, or refracting surface, are not greatly detrimental to accuracy, and such surface may therefore, if desired, be left in the state it comes from the mold, or be merely firepolished, but I do not in this application claim a light projector having such polished and silvered rear surface, and a pressed forward surface, as that forms the subject-matter of another application filed on the 22nd day of December, 1922, by Henry Phelps Gage.

Figure 2:
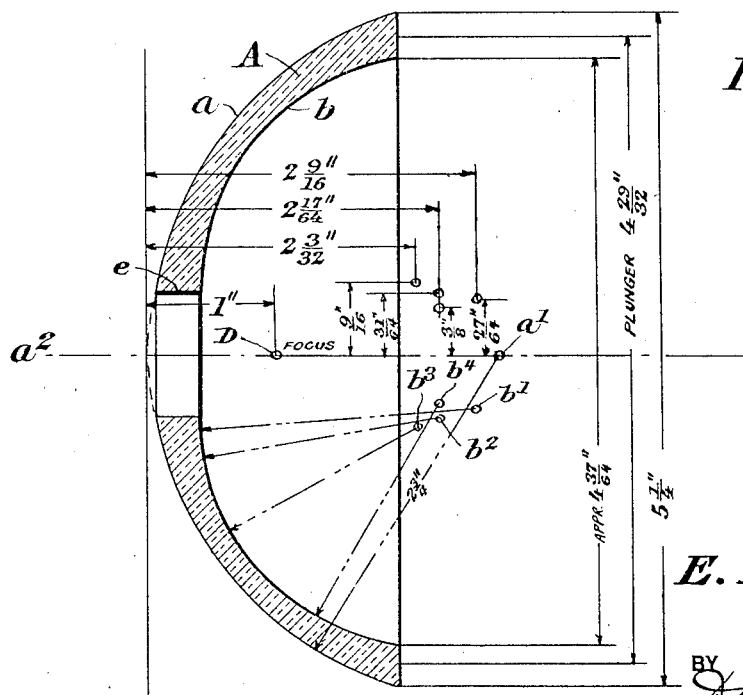
Figure 2, is a diagram illustrating in a quantitative manner, a set of curvatures which are suggested as embodying a specific type thereof.

In Figure 2 is shown a quantitative example of a light projecting element falling within this invention, the refractive index of the glass being 1.53. It will be understood, however, that this example is given merely to aid in the understanding of how the same may be constructed, and not as a limitation on the scope.

Having thus described my invention, I declare that what I claim is:

1. The combination of a katadioptric light projecting element having a convex reflecting rear face and a concave refracting front face, such faces being so shaped that the element gradually thickens radially on both sides of a circle intermediate of its principal axis and its periphery, with a light source located substantially at the principal focal point of that part of the reflecting face corresponding to such circle.

2. The combination of a katadioptric light projecting element having a sperical reflecting rear face, a concave refracting front face so struck that the element gradually thickens on both sides of a circle intermediate of its principal axis and its periphery, with a light source located at substantially the principal focal point of that part of the reflecting face corresponding to such circle.

EMILIO PASCUCCI.